(12) United States Patent
Silvestro

(10) Patent No.: US 6,969,825 B2
(45) Date of Patent: Nov. 29, 2005

(54) SIDE DOOR ASSEMBLY

(75) Inventor: Nino Silvestro, Independence, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 39 days.

(21) Appl. No.: 10/650,629

(22) Filed: Aug. 28, 2003

(65) Prior Publication Data

US 2005/0045609 A1 Mar. 3, 2005

(51) Int. Cl.[7] .............................. B23K 9/10; E05D 15/56
(52) U.S. Cl. ........................ 219/133; 49/208; 49/409; 49/463
(58) Field of Search ................................ 219/133, 134; 290/1 R, 1 A; 312/107, 111; 403/375, DIG. 10, 403/387, 82; 49/208, 409, 463

(56) References Cited

U.S. PATENT DOCUMENTS

| | | | | |
|---|---|---|---|---|
| 4,679,368 A | * | 7/1987 | Pettinga et al. | ............. 52/36.4 |
| 5,734,148 A | * | 3/1998 | Latvis et al. | ................ 219/133 |
| 6,095,574 A | * | 8/2000 | Dean | ........................... 292/164 |
| 6,186,357 B1 | * | 2/2001 | Kyle | ........................... 220/841 |
| 6,227,018 B1 | * | 5/2001 | Miller et al. | ................... 70/58 |
| 6,416,144 B1 | * | 7/2002 | Houston et al. | ............ 312/209 |
| 2004/0178182 A1 | * | 9/2004 | Radtke | ..................... 219/130.1 |

\* cited by examiner

*Primary Examiner*—Kevin P. Kerns
(74) *Attorney, Agent, or Firm*—Fay, Sharpe, Fagan, Minnich & McKee, LLP

(57) ABSTRACT

An electric arc engine welder includes a housing having a cavity therein. An opening is defined by the housing and is connected to the cavity. A track member is mounted to the housing adjacent the opening. The track member defines at least one slot along a longitudinal extent thereof. Two hooks are connected to a door and are received in the at least one slot for removably mounting the door to the housing. The two hooks are spaced apart from one another a first distance. Two notches are defined in the track member and are connected to the at least one slot. The two notches are spaced apart from one another a second distance that is different than a first distance. The notches allow the door to be removed from the housing.

22 Claims, 5 Drawing Sheets

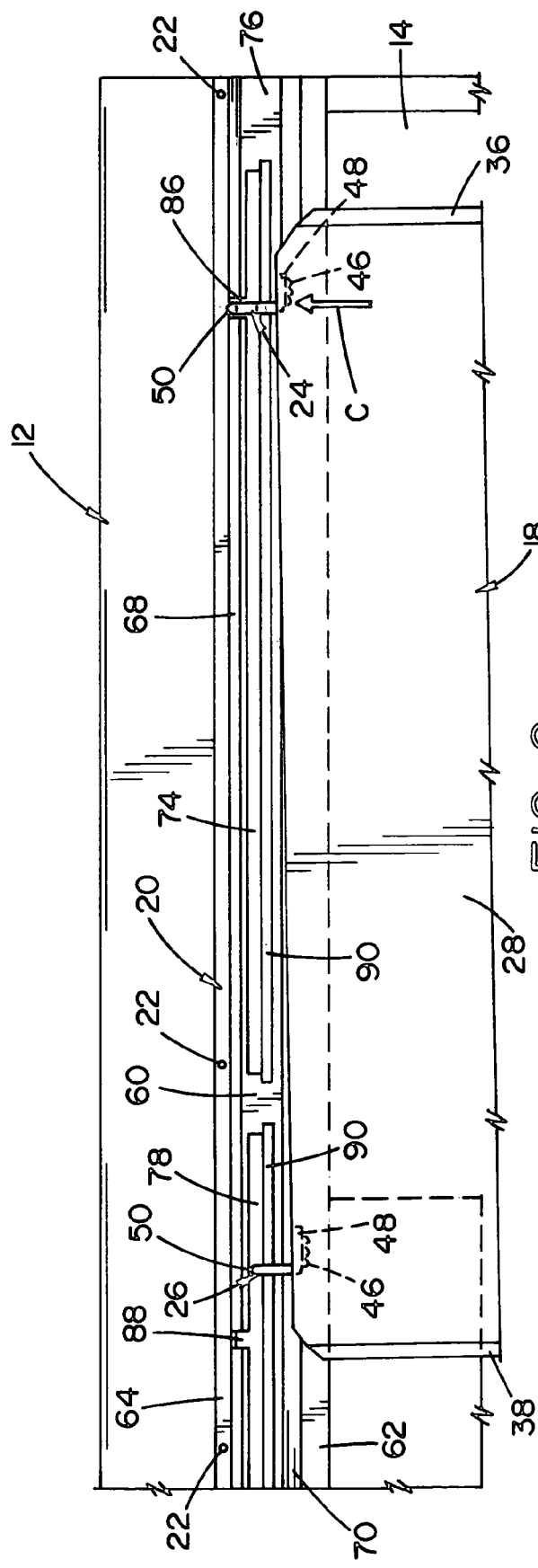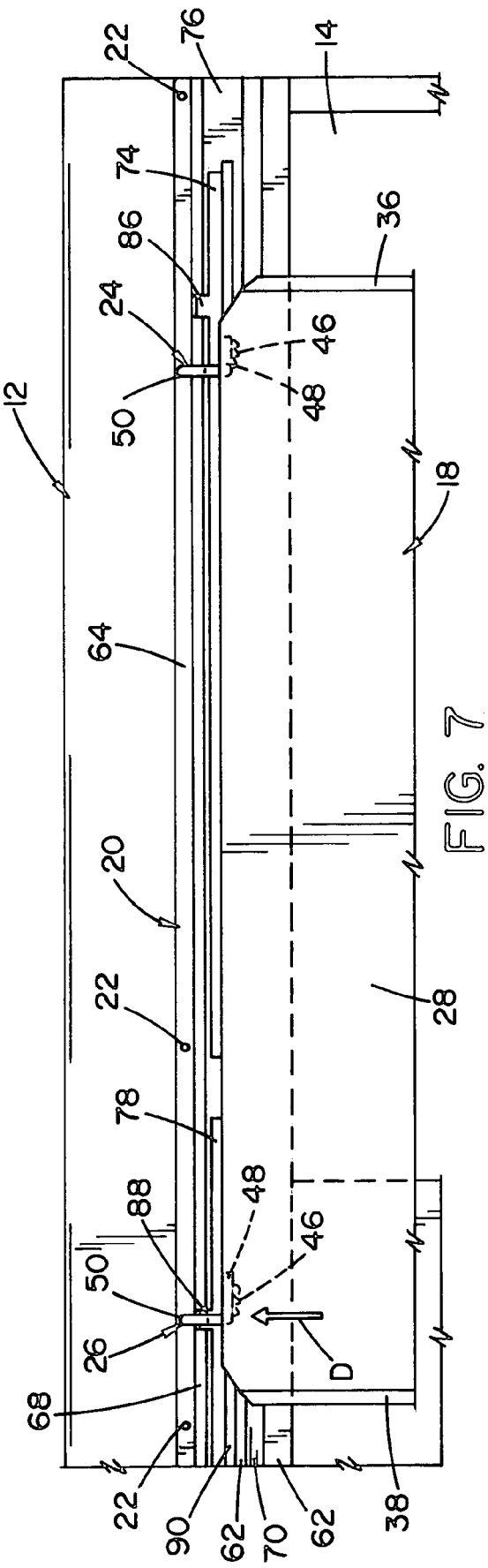

SIDE DOOR ASSEMBLY

BACKGROUND OF THE INVENTION

1. Field of the Invention

The present invention relates to a door assembly and, more particularly, to a slidably removable door assembly. The present invention finds particular application as a side door assembly for use on an electric arc engine welder and will be described with particular reference thereto. However, it is to be appreciated that the present invention may relate to other similar environments and applications.

2. Description of the Art

It is well known to provide doors or openable panels on housings of electric arc engine welders for providing access therein. Access within the housing of an electric arc engine welder allows components contained within the housing to be serviced or replaced when desired. Often, the doors or panels of engine welder housings are adapted to be removable from their respective housings for purposes of allowing the doors or panels to be totally removed as obstructions when desirable to work on one or more of the components contained within the engine welder housing.

One problem with removable doors or panels on engine welder housings is that they may inadvertently separate from the engine welder housing at times when such separation is not desirable. Thus, there is a need for a door assembly that allows a door to be removable from an engine welder housing while eliminating or reducing inadvertent separation of the door from the engine welder housing.

SUMMARY OF THE INVENTION

The present invention provides a new and improved side door assembly that overcomes the foregoing difficulties and others and provides the aforementioned and other advantageous features. More particularly, in accordance with one aspect of the invention, an electric arc engine welder is provided. In accordance with this aspect of the invention, the electric arc engine welder includes a housing having a cavity therein. An opening is defined by the housing and connected to the cavity. A track member is mounted to the housing adjacent the opening. The track member defines at least one slot along a longitudinal extent of the track member. Two hooks are connected to a door and are received in the at least one slot for removably mounting the door to the housing. The two hooks are spaced apart from one another a first distance. Two notches are defined in the track member and are connected to the at least one slot. The two notches are spaced apart from one another a second distance that is different than the first distance. The notches allow the door to be removed from the housing.

In accordance with another aspect of the present invention, a side door assembly for use on an electric arc engine welder is provided. More particularly, in accordance with this aspect of the invention, the side door assembly includes a hanger member mounted on an associated arc engine welder housing. First and second hooks each have first ends hooked onto the hanger member and opposite ends connected to a door thereby hanging the door from the hanger member. The hooks are slidable on the hanger member to move the door between an open position and a closed position. The first hook is removable from the hanger member only when the door is moved to a first hook removal position. The second hook is removable from the hanger member only when the door is moved to a second hook removal position which is spaced apart from the first hook removal position.

In accordance with still another aspect of the present invention, a door assembly is provided. More particularly, in accordance with this aspect of the invention, the door assembly includes a track member defining at least one slot. A door is slidably movable along the track member. A first hook has a first end affixed to the door and a second hooked end received in the at least one slot. A second hook has a first end affixed to the door and a second hooked end received in the at least one slot. A first notch is defined in the track member adjacent the at least one slot for allowing the first hook to be disconnected from the track member when the door is moved along the track member to a position wherein the first hook is aligned with the first notch. A second notch is defined in the track member adjacent the at least one slot for allowing the second hook to be disconnected from the track member when the door is moved along the track member to a position wherein the second hook is aligned with the second notch. The locations of the first and second notches prevent the first and second hooks from being simultaneously aligned with the first and second notches.

In accordance with yet another aspect of the present invention, a door assembly is provided. More particularly, in accordance with this aspect of the invention, the door assembly includes a track member mounted to a housing. A door is slidably movable along the track member and is adapted to move between an open position and a closed position. First and second hooks for carrying the door along the track member are provided. The first and second hooks are affixed to the door such that the first hook is spaced apart from the second hook a first distance. First and second notches are defined in the track member and are spaced apart a second distance. The first notch is appropriately sized to allow the first hook to be selectively detached from the track member and the second notch is appropriately sized to allow the second hook to be selectively detached from the track member. The second distance is unequal to the first distance to prevent simultaneous detachment of the first and second hooks from the track member.

BRIEF DESCRIPTION OF THE DRAWINGS

The invention may take form in various components and arrangements of components and in various steps and arrangements of steps. The drawings are only for purposes of illustrating a preferred embodiment and are not to be construed as limiting the invention.

FIG. 6 is a partial side elevational view of the electric arc engine welder of FIG. 1 showing the side door assembly in a first hook removal position.

FIG. 7 is a partial side elevational view of the electric arc engine welder of FIG. 1 showing the side door assembly in a second hook removal position.

DETAILED DESCRIPTION OF THE PREFERRED EMBODIMENT

Figure 1:
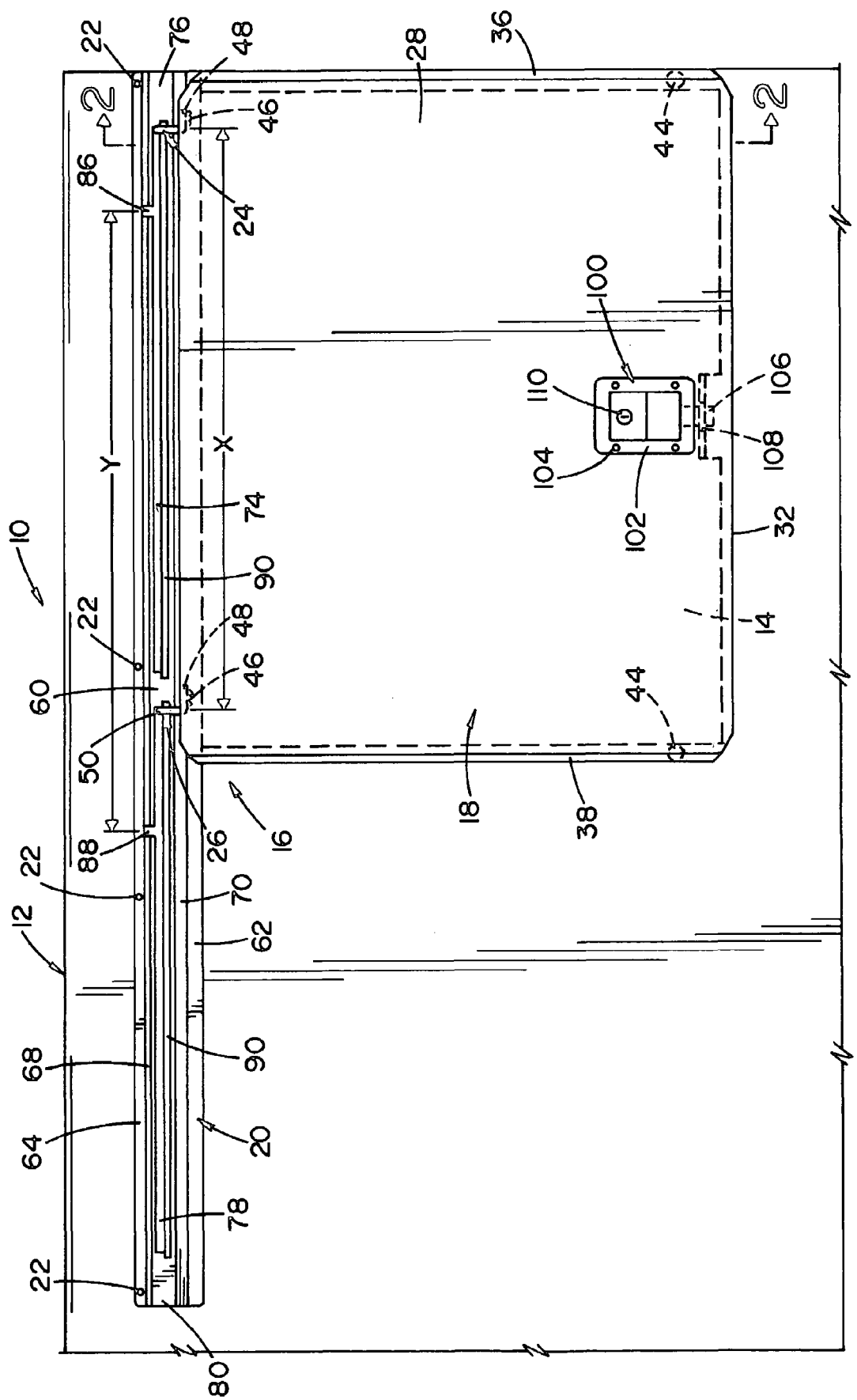
FIG. 1 is a partial side elevational view of an electric arc engine welder having a side door assembly in accordance with a preferred embodiment of the present invention.

With reference now to the drawings wherein the showings are for purposes of illustrating the preferred embodiment of the invention only and not for purposes of limiting the same, FIG. 1 shows an electric arc engine welder generally designated by reference numeral 10. The engine welder 10 includes a housing 12 having a cavity therein for operatively receiving components (not shown) of the engine arc welder. The housing 12 defines a housing opening 14 connected to the cavity for providing access thereto. A door assembly 16 is provided adjacent the opening 14 for selectively providing access into the housing 12 to one or more of the components of the engine welder 10 contained therein.

More particularly, the door assembly 16 includes a door or panel 18 slidably connected to a track or hanger member 20. The track member 20 is mounted to a side of the housing 12 adjacent the opening 14 by a plurality of fasteners 22 such that a longitudinal extent of the track member 20 is generally horizontally oriented. As will be described in more detail below, hooks, including first door carrier hook 24 and second door carrier hook 26, hang the door 18 from the track member 20 such that the door 18 is slidably movable along the track member 20.

Figure 2:
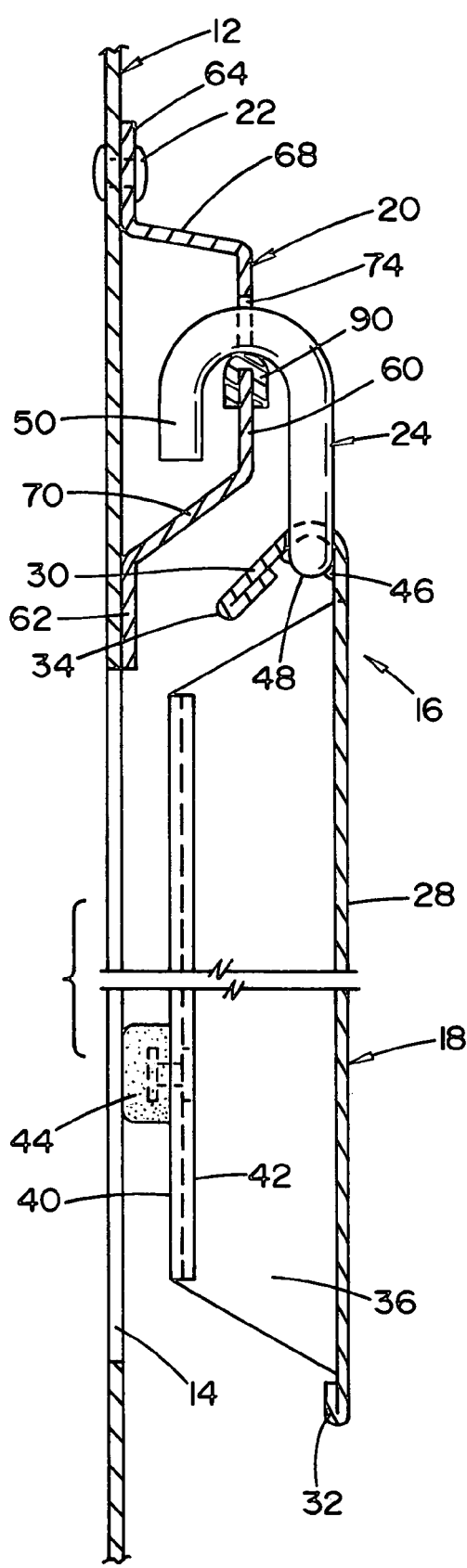
FIG. 2 is a partial cross-sectional view of the electric arc engine welder taken along the line 2—2 of FIG. 1.

With additional reference to FIG. 2, the door 18 includes a generally flat front face 28. A hook flange 30 extends at an angle extending rearwardly from the front face 28 for purposes of receiving the first and second hooks 24,26. Further, the hook flange 30 prevents the door 18 from moving upwardly in the direction of the track member 20. More specifically, the track member 20 extends outwardly from the housing 12 a distance such that lifting of the door 18 could cause the hook flange 30 to engage and be obstructed by the track member 20.

The door 18 further includes a reinforced bottom edge 32 which is formed by folding over an edge portion of the door upon the front face 28. Similarly, the hook flange 30 includes a reinforced edge 34 formed by folding over a portion of the hook flange 30 upon itself. With reference to FIGS. 1 and 2, the door 18 includes side flanges 36,38 flanking either side of the front face 28. The side flanges 36,38 extend at respective angles rearwardly from the front face 28. Distal edges of the side flanges 36,38 are formed into U-shaped channel portions each including a rear face portion 40 and a rear reinforcing flange 42. Rubber stoppers 44 are connected to respective rear face portions 40 by suitable fasteners such as rivets or the like. The rubber stoppers 44 serve to maintain the door 18 in a position generally parallel to the side of the housing 12. More particularly, without the rubber stoppers 44, the door 18 would likely tilt wherein the reinforced bottom edge 32 would be closer to the side of the housing than a top of the front face 28.

Figure 4:
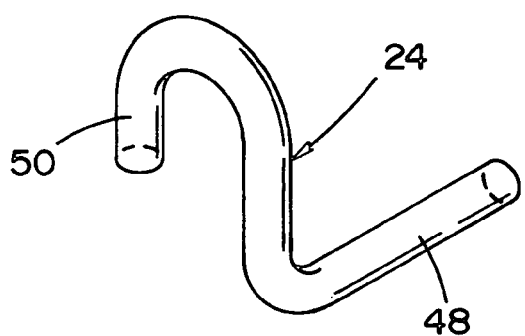
FIG. 4 is an enlarged perspective view of a hook of the side door assembly of FIG. 1.

The hooks 24,26 are spaced apart from one another a first distance, dimension X, and are connected or affixed to the door 18 via welds 46. More specifically, with additional reference to FIG. 4, a lower hook section or first end 48 of each of the hooks 24,26 is received in a bite portion of the door 18 formed between the front face 28 and the hook flange 30. An upper hook section or second hooked end 50 of each of the hooks 22,24 is formed perpendicularly relative to the lower hook section 48 and curves around therefrom for hanging from the track member 20, as will be described in more detail below.

With specific reference to FIG. 2, the track member 20 is generally channel-shaped and includes a raised front wall 60 substantially parallel to the side of the housing 12 and spaced apart from the side of the housing 12. The channel member 20 further includes a bottom mating wall 62 that rests against the side of the housing 12 and a top mating wall 64 that rests against the side of the housing 12 and is connected thereto via the fasteners 22 which may be rivets, bolts, screws, or other connecting members. The top mating wall 64 connects to the raised front wall 60 by an angled top side wall 68. Likewise, the bottom mating wall 62 connects to the raised front wall 60 by a bottom side wall 70 angled relative to the bottom mating wall 62 and the raised front wall 60.

The track member 20 defines at least one slot along a longitudinal extent thereof. More specifically, with reference to FIG. 1, a first slot 74 of the at least one slot is defined in the raised front wall 60 adjacent a first end 76 of the track member 20. Similarly, a second slot 78 of the at least one slot is defined in the raised wall 60 adjacent a second end 80 of the track member 20. A first notch 86 is defined in the raised front wall 60 and in the top side wall 68 adjacent to and above the first slot 74. A second notch 88 is defined in a portion of the raised front wall 60 and the top side wall 68 adjacent to and above the second slot 78. The second notch 88 is spaced apart from the first notch 86 a second distance, dimension Y. With reference to FIG. 1, the first distance, dimension X, between the hooks 24,26 is different, i.e., unequal, to the second distance, dimension Y, between the notches 86,88.

Figure 3:
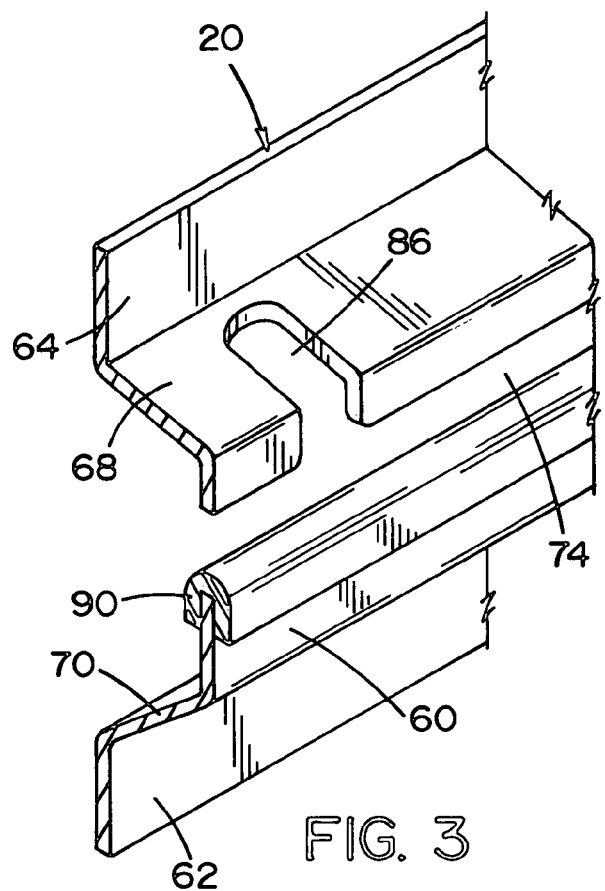
FIG. 3 is a partial enlarged perspective view of a slot of the side door assembly of FIG. 1.

With additional reference to FIGS. 2 and 3, both the first and second notches 86,88 are connected to respective first and second slots 74,78 and, as will be described in more detail below, the notches 86,88 allow the door 18 to be removed from the housing 12. Specifically, the second hooked end 50 of the first hook 24 is received in the first slot 74 and, likewise, the second hooked end 50 of the second hook 26 is received in the second slot 78. Within their respective slots 74,78, the hooks 24,26 are slidably movable for moving the door 18 along the track member 20. An ultra low friction slide or protector 90, preferably a material like polyethylene acetal or Teflon, is provided along each of the first and second slots 74,78 on a portion of the raised front wall 60 defining a lower end of the slots 74,78 for engaging the hooks 24,26.

With specific reference to FIG. 1, the door 18 further includes a lock assembly 100 positioned adjacent the bottom edge 32 of the door 18. The lock assembly 100 includes a lock housing 102 secured to the door 18 via fasteners 104 such as bolts, screws, or the like. The lock assembly 100 further includes a lock 106 selectively received within a lock opening or slot 108 defined in a wall extending from the side of the housing 12. A keyhole 110 is provided for receiving a corresponding key (not shown) to selectively move the lock 106 between a locked position wherein the lock 106 extends into the slot 108 and an unlocked position wherein the lock 106 is retracted from the slot 108. When the door 18 is closed and the lock 106 is in the locked position, the door 18 is locked in the closed position. Alternatively, in addition to or instead of the lock assembly, a throughhole in the door 18 and an aligned throughhole in a skirt depending from the wall that extends from the side of housing 12 can be provided. A conventional pad lock could then be used with the aligned throughholes for locking the door 18 in the closed position.

Figure 5:
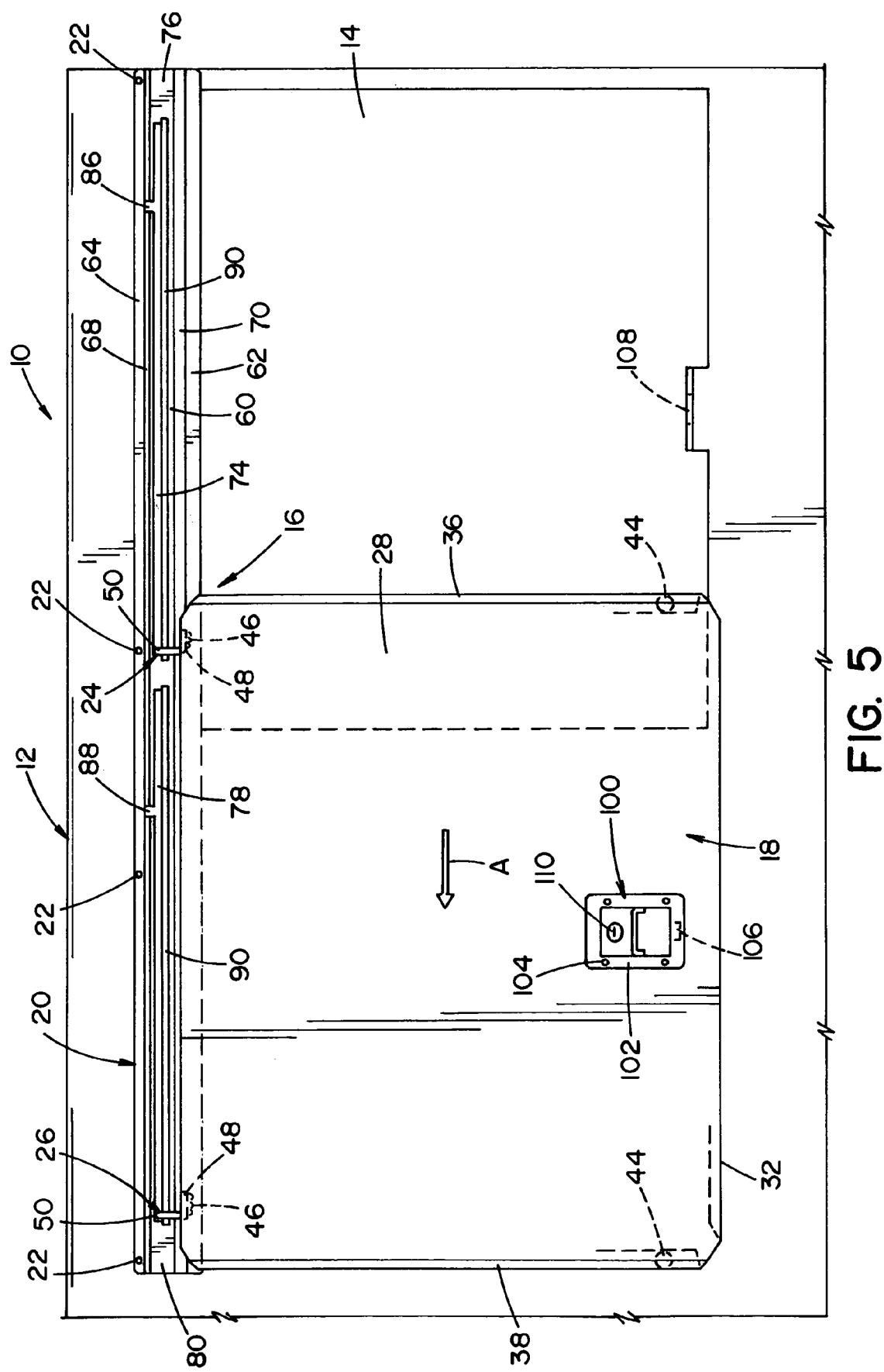
FIG. 5 is a partial side elevational view of the electric arc engine welder of FIG. 1 showing the side door assembly in an open, attached position.

With additional reference to FIG. 5, the door 18 is slidably movable from a closed position wherein the door 18 obstructs the opening 14 to or toward an open, attached position by moving the door 18 in the direction of arrow A. In the open position, access to the opening 14 is provided and the upper hook sections 50 of the hooks 24,26 are still received within respective slots 74,78 and the door 18 is not in position to be removed from the housing 12, i.e., neither of the hooks 24,26 is aligned with or removable through the notches 86,88. Thus, with additional reference FIG. 2, pivoting the door 18 outwardly from the housing 12 will not release the hooks 24,26 from the slots 74,78 and the door 18 is maintained in attached engagement to the housing 12 while the opening 14 is partially revealed. Even if the door 18 is inadvertently moved toward the open, attached position, the door 18 is unlikely to disengage from the housing 12.

Figure 8:
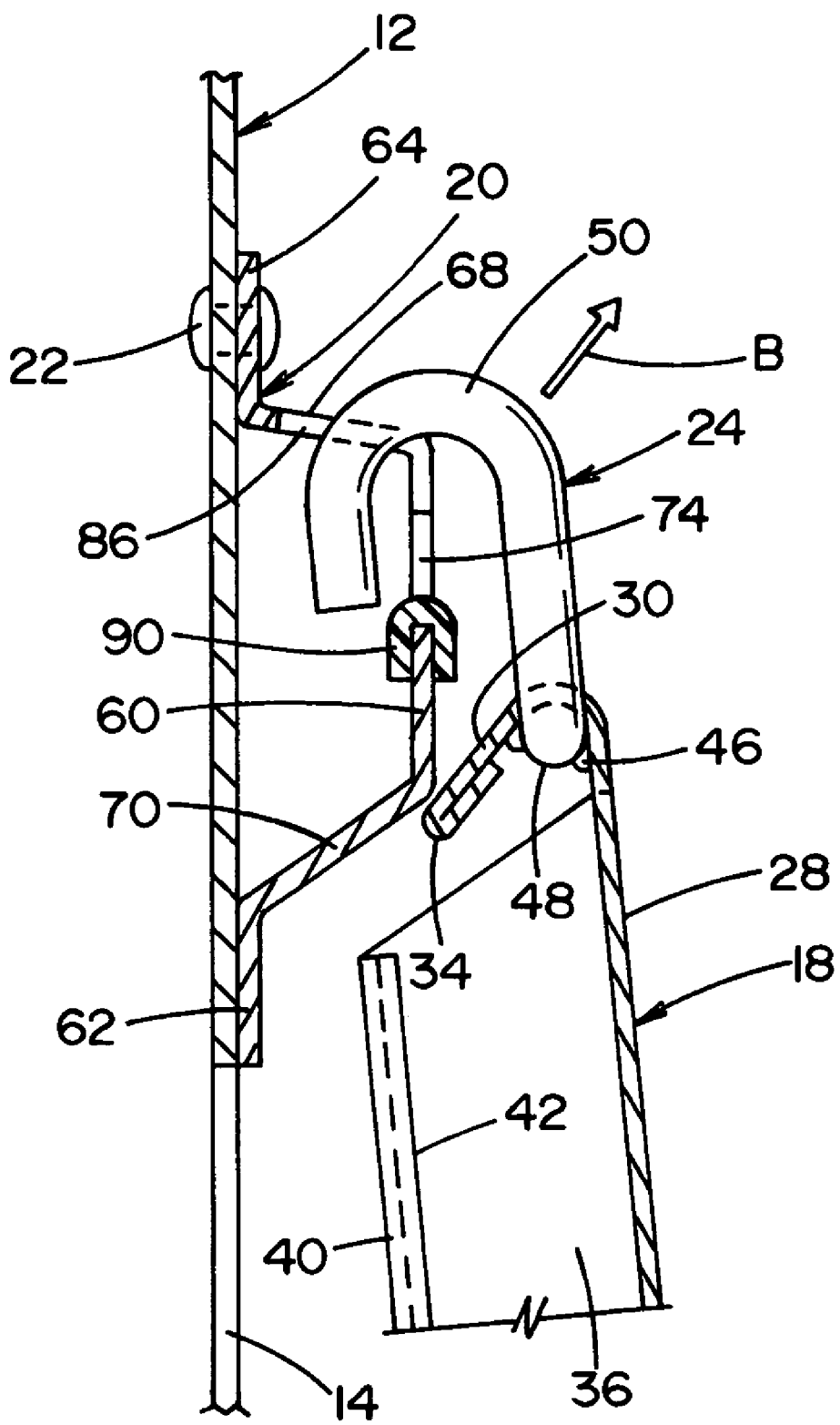
FIG. 8 is a partial cross-sectional view of the electric arc engine welder of FIG. 7 showing a side door of the side door assembly being removed therefrom.

With additional reference to FIG. 8, to remove the door 18 from the housing 12, the door 18 is pivoted in the direction of arrow B. With the door 18 pivoted the hook flange 30 is moved outwardly relative to the bottom side wall 70 wherein the bottom side wall 70 is no longer in an obstruction to the hook flange 30 if the door 18 is moved upwardly. With additional reference to FIG. 6, the door 18 can be slidably moved to a first hook removal position wherein the first hook 24 is aligned with the first notch 86. The first notch 86 is appropriately sized such that, with the door 18 pivoted, the first hook 24 can be removed from the first slot 74 of the track member 20 by passing it through the first notch 86 by raising the door 18 in the direction of arrow C. In the first hook removal position, only the first hook 24 is aligned with the first notch 86, i.e., the second hook 26 is not aligned with the second notch 88 and, therefore, is not removable from the second slot 78.

With further reference to FIG. 7, the door 18, with the first hook 24 already removed from the track member 20, can be slidably moved to a second hook removal position wherein the second hook 26 is aligned with the second notch 88. The second notch 88 is appropriately sized such that, with the door 18 pivoted as described above, the second hook 26 can be removed from the second slot 78 of the track member 20 by passing it through the second notch 88 by raising the door 18 in the direction of arrow D. With both hooks 24,26 removed from the track member 20, the door 18 is now readily removed from the housing 12. The varied spacing between the hooks 24,26 and the notches 86,88 prevents both the first and second hooks 24,26 from being simultaneously aligned with the notches 86,88 thereby preventing simultaneous removal of the hooks 24,26 from the track member 20. This reduces or eliminates any likelihood that the door 18 will inadvertently separate from the housing 12 because each hooks 24,26 is required to be separately removed from the track member 20.

The door 18 can be reattached to the housing 12 by reversing the actions described hereinabove. More specifically, the second hook 26 can be reattached to the track member 20 by passing the second hook 26 through the second notch 88 such that the hook 26 engages the slide 90. Once the second hook 26 is engaged to the track member 20, the door 18 can be slidably moved back toward the first hook removal position and the first hook 24 can be reinserted through the first notch 86 to reengage the first hook 24 to the slide 90. With both hooks 24,26 reattached, the door 18 can be slid back to the closed position.

The invention has been described with reference to the preferred embodiment. Obviously, modifications and alterations will occur to others upon reading and understanding the preceding detailed description. It is intended that the invention be construed as including all such modifications and alterations insofar as they are within the scope of the appended claims and the equivalents thereof.

What is claimed is:

1. An electric arc engine welder comprising:
    a housing having a cavity therein;
    an opening defined by the housing and connected to the cavity;
    a track member mounted to the housing adjacent the opening, the track member defining at least one slot along a longitudinal extent thereof;
    two hooks connected to a door and received in the at least one slot for removably mounting the door to the housing, the two hooks spaced apart from one another a fixed first distance;
    two notches defined in the track member and connected to the at least one slot, the two notches spaced apart from one another a second distance that is different than the first distance, the notches allowing the door to be removed from the housing.

2. The electric arc engine welder of claim 1 wherein the door is movable along the track member between a closed position wherein the door obstructs the opening and an open position wherein access to the opening is provided and the door remains mounted to the housing.

3. The electric arc engine welder of claim 1 wherein the track member is oriented such that a longitudinal extent thereof is generally horizontal and the two notches are positioned above the at least one slot.

4. The electric arc engine welder of claim 3 wherein the door is slidable along the at least one slot to a first hook removal position wherein a second hook of the at least two hooks is aligned with a second notch of the two notches and is removable from the at least one slot by passing through the second notch.

5. The electric arc engine welder of claim 4 wherein a first hook of the at least two hooks is not aligned with a first notch of the two notches and is not removable from the at least one slot when the door is in the first hook removal position.

6. The electric arc engine welder of claim 4 wherein the door is slidable along the slot to a second hook removal position wherein a first hook of the two hooks is aligned with a first notch of the two notches and is removable from the at least one slot by passing through the first notch.

7. The electric arc engine welder of claim 1 further including:
    a lock for selectively locking the door in a closed position wherein the door covers the opening.

8. The electric arc engine welder of claim 1 wherein the track member includes a protector along an edge defining the at least one slot for engaging the two hooks.

9. The electric arc engine welder of claim 1 wherein the door is removable from the housing by passing a first hook of the two hooks through a first notch of the two notches and subsequently passing a second hook of the two hooks through a second notch of the two notches.

10. A side door assembly for use on an electric arc engine welder, the side door assembly comprising:
    a hanger member mounted on an associated arc engine welder housing;
    first and second hooks each having first ends hooked onto the hanger member and opposite ends connected to a door thereby hanging the door from the hanger member, the hooks slidable on the hanger member to move the door between an open position and a closed position; and wherein the first hook is removable from the hanger member only when the door is moved to a first hook removal position and the second hook is removable from the hanger member only when the door is moved to a second hook removal position which is spaced apart from the first hook removal position.

11. The side door assembly of claim 10 wherein the hanger member defines at least one slot for receiving the second ends of the first and second hooks.

12. The side door assembly of claim 11 wherein the hanger member defines two notches adjacent the at least one slot for allowing removal of the first and second hooks when the hooks are aligned respectively with the two notches, a first of the two notches aligned with the first hook when the door is in the first hook removal position and the second of the two notches aligned with the second hook when the door is in the second hook removal position.

13. The side door assembly of claim 12 wherein the hanger member is oriented such that a longitudinal extent thereof is generally horizontal and the two notches are located above the at least one slot.

14. The side door assembly of claim 10 further including:
a lock for locking the door in the closed position.

15. A door assembly comprising:
a track member defining at least one slot;
a door slidably movable along the track member;
a first hook having a first end affixed to the door and a second hooked end received in the slot;
a second hook having a first end affixed to the door and a second hooked end received in the slot;
a first notch defined in the track member adjacent the at least one slot for allowing the first hook to be disconnected from the track member when the door is moved along the track member to a position wherein the first hook is aligned with the first notch; and
a second notch defined in the track member adjacent the at least one slot for allowing the second hook to be disconnected from the track member when the door is moved along the track member to a position wherein the second hook is aligned with the second notch, the locations of the first and second notches prevent the first and second hooks from being simultaneously aligned with the first and second notches.

16. The door assembly of claim 15 wherein the first hook is only disconnectable from the track member by passing the first hook second end through the first notch while the door is angled relative to the track member.

17. The door assembly of claim 16 wherein the second hook is only disconnectable from the track member by passing the second hook second end through the second notch while the door is angled relative to the track member.

18. The door assembly of claim 15 wherein the track member includes a protector along at least one edge defining the slot which engages the first and second hooks.

19. The door assembly of claim 18 wherein the protector is made of an ultra low friction material.

20. The door assembly of claim 19 wherein the ultra low friction material is one of polyethylene acetal and polytetrafluoroethylene.

21. A door assembly comprising:
a track member mounted to a housing;
a door slidably movable along the track member and adapted to move between an open position and a closed position;
first and second hooks for carrying the door along the track member, the first and second hooks affixed to the door such that the first hook is spaced apart from the second hook a first distance; and
first and second notches defined in the track member and spaced apart a second distance, the first notch appropriately sized to allow the first hook to be selectively detached from the track member and the second notch appropriately sized to allow the second hook to be selectively detached from the track member, the second distance being unequal to the first distance to prevent simultaneous detachment of the first and second hooks from the track member.

22. The door assembly of claim 21 wherein the first and second hooks are nonmovably affixed to the door such that the first distance remains fixed between the first and second hooks.

* * * * *